United States Patent
Rönngren

(10) Patent No.: US 11,423,516 B2
(45) Date of Patent: Aug. 23, 2022

(54) GAZE ENHANCED NATURAL MOTION BLUR

(71) Applicant: Tobii AB, Danderyd (SE)

(72) Inventor: Denny Rönngren, Danderyd (SE)

(73) Assignee: Tobii AB, Danderyd (SE)

( * ) Notice: Subject to any disclaimer, the term of this patent is extended or adjusted under 35 U.S.C. 154(b) by 29 days.

(21) Appl. No.: 16/833,790

(22) Filed: Mar. 30, 2020

(65) Prior Publication Data

US 2020/0394766 A1    Dec. 17, 2020

(51) Int. Cl.
    *G06T 5/00*     (2006.01)
    *G06F 3/01*     (2006.01)
    *G06T 7/20*     (2017.01)
    *G06V 40/18*    (2022.01)

(52) U.S. Cl.
    CPC ............. *G06T 5/003* (2013.01); *G06F 3/013* (2013.01); *G06T 7/20* (2013.01); *G06V 40/193* (2022.01); *G06T 2207/20201* (2013.01)

(58) Field of Classification Search
    None
    See application file for complete search history.

(56) References Cited

U.S. PATENT DOCUMENTS

| | | | | |
|---|---|---|---|---|
| 2006/0280249 A1* | 12/2006 | Poon | ................ | G06T 5/50 375/240.16 |
| 2008/0259169 A1* | 10/2008 | Nagano | ............. | H04N 5/23254 348/E5.037 |
| 2010/0026827 A1 | 2/2010 | Kobayashi | | |
| 2013/0113950 A1* | 5/2013 | Park | .................... | G06T 5/50 348/208.4 |
| 2013/0300828 A1* | 11/2013 | Yamato | .............. | H04N 13/30 348/44 |
| 2014/0347265 A1 | 11/2014 | Aimone | | |
| 2015/0022435 A1 | 1/2015 | Luebke | | |
| 2015/0054955 A1 | 2/2015 | Lim | | |
| 2015/0178898 A1 | 6/2015 | Routhier | | |
| 2016/0323596 A1 | 11/2016 | Condorovici et al. | | |
| 2017/0054938 A1* | 2/2017 | Xu | .................. | H04N 7/0127 |
| 2019/0102944 A1* | 4/2019 | Han | ................... | G06T 15/20 |

(Continued)

FOREIGN PATENT DOCUMENTS

WO    WO-2018173445 A1 *    9/2018

OTHER PUBLICATIONS

Stengel, M., Bauszat, P., Eisemann, M., Eisemann, E. and Magnor, M., 2014. Temporal video filtering and exposure control for perceptual motion blur. IEEE transactions on visualization and computer graphics, 21(5), pp. 663-671. (Year: 2014).*

(Continued)

*Primary Examiner* — Michelle M Entezari
(74) *Attorney, Agent, or Firm* — Kilpatrick Townsend & Stockton LLP

(57) ABSTRACT

There is provided systems, methods and computer program products for generating motion blur on image frames, comprising: obtaining gaze data related to an eye movement between consecutive images, determining movement of at least one object in relation to said gaze data by calculating the difference in position of said at least one object and said gaze data between the image frames, forming a motion blur vector and applying a motion blur on an image frame based on said motion blur vector.

11 Claims, 6 Drawing Sheets

(56) References Cited

U.S. PATENT DOCUMENTS

2020/0175761 A1* 6/2020 Jones .................... G06F 3/012
2022/0070377 A1* 3/2022 Hirama .............. H04N 5/23258

OTHER PUBLICATIONS

Stengel, Michael, and Marcus Magnor. "Gaze-contingent computational displays: Boosting perceptual fidelity." IEEE Signal Processing Magazine 33, No. 5 (2016): 139-148. (Year: 2016).*
WO 2018/173445 A1 [Machine Translation] (Year: 2018).*
Swedish Search Report and Written Opinion of Swedish App. No. 1950393-7, dated Nov. 21, 2019.

* cited by examiner

GAZE ENHANCED NATURAL MOTION BLUR

CROSS-REFERENCES TO RELATED APPLICATIONS

This application claims priority to Swedish Application No. 1950393-7, filed Mar. 29, 2019; the content of which are hereby incorporated by reference.

TECHNICAL FIELD

The invention relates to a method for generating motion blur, a system for generating motion blur for a sequence of image frames, a head-mounted display, a computer program for generating motion blur for a sequence of image frames, and a computer-readable medium.

BACKGROUND ART

In motion picture images, when action is captured, any movement of the object being captured introduces motion blur within each frame. This is particular important when simulating for instance speed in a video game, such as racing games, because it increases realism and the sense of speed. Motion blur may also help to smooth the appearance of the game when the resolution is low due to low frame rate of the display and/or bad quality of the graphic card.

For many motion blur techniques, each scene is normally sent through the entire graphics pipeline more than once within the optimum frame rate of the application. Hence, these techniques require a powerful engine to render the scenes with motion blur.

There are different methods on the market on how apply the motion blur on scenes. Nowadays, it is current practice to apply the choice of a particular setting for motion blur uniformly over the entire spatial range of each output frame.

In today's rendering pipelines, motion blur is applied on the scene itself using intra frame information only, where the input is the movement of the objects and the movement of the scene camera. The model for model blur typically used is therefore incorrect.

For instance, if the screen is showing a passing landscape, scrolling from right to left in a steady pace, then all of the landscape will always have the same amount of motion blur applied. Now, if the user follows one of the objects in the scene as it passes from right to left, then the object will appear blurry due to the applied motion blur. The same would apply to following the blades of windmill with the eyes shown in FIG. 1. The current algorithms render all blades with the same amount of motion blur, which is an incorrect model if the user follows one of the blades with the gaze.

When a moving picture is displayed, each frame is flashed on a screen for a short time (usually ¼24, ¼25 or ⅓30 of a second) and then immediately replaced by the next one. The frames are blended together producing an illusion of a moving image. The frame is also sometimes used as a unit of time, each being a series of time points.

SUMMARY OF THE INVENTION

The present disclosure overcomes the above-mentioned problems by providing a method for generating motion blur, said method comprises the steps of obtaining gaze data related to an eye movement between a first image and a consecutive image, determining a relative movement of at least one object in relation to said gaze data during a sequence of image frames of at least two images, by calculating the difference in position of said at least one object and said gaze data between said first image frame and said consecutive image frame, forming a motion blur vector based on the relative movement of said at least one object in relation to said gaze data and applying a motion blur on a second image frame based on said motion blur vector.

As known, motion blur is a natural effect of an object moving in relation to the eye and accordingly it is important to take into consideration the relative movement of at least one object in relation to the gaze data when generating motion blur artificially. This type of motion blur creates a more realistic and natural virtual world to be rendered on a display.

Further, the relative movement of at least one object in relation to the gaze data may be a movement resultant vector between the movement vector of the gaze data and the movement vector of the at least one object.

Further, the step of forming a motion blur vector may comprise determining a movement resultant vector between said relative movement of said at least one object and a movement vector of said gaze data.

In addition, the step of forming a motion blur vector may also be based on a movement of a motion scene camera, which is used for capture said sequence of image frames.

Further, the second image frame and the consecutive frame may be different frames with a time delay between them but it may also occur that the second image frame arrives without time delay and is then considered as being the consecutive image frame.

The method may further obtain, from an eye tracker, gaze data that comprises measurements of an eye orientation. The eye tracker is configured to give the information that is needed for creating an enhanced motion blur.

The method may be a computer-implemented method that is performed by a scene renderer upon execution of a computer program by a processor of the scene renderer.

The present disclosure is also provided by a system for generating motion blur for a sequence of image frames. The system comprises a scene renderer configured to: obtain gaze data related to an eye movement between a first image and a consecutive image; determine a relative movement of at least one object in relation to said gaze data during a sequence of image frames, comprising at least two images by calculating the difference in position of said at least one object and said gaze data between said first image frame and said consecutive image frame; form a motion blur vector based on the relative movement of said at least one object in relation to said gaze data; and apply a motion blur on a second image frame based on said motion blur vector.

Further, the system may further comprise a scene camera configured to capture a sequence of image frames, each having at least one object.

Yet further, the system may comprise an eye tracker configured to determine said gaze data related to an eye movement and send said gaze data to the scene renderer.

Further, there is provided a head-mounted display. The head-mounted display comprises: a frame adapted to be worn by a user; a display; and a scene renderer. The scene renderer is configured to: obtain gaze data related to an eye movement between a first image and a consecutive image; determine a relative movement of at least one object in relation to said gaze data during a sequence of image frames, comprising at least two images by calculating the difference in position of said at least one object and said gaze data between said first image frame and said consecutive image frame; form a motion blur vector based on the relative movement of said at least one object in relation to said gaze data; and apply a motion blur on a second image frame based on said motion blur vector. Further, the display is configured to render said applied motion blur on the second image frame.

In one example, the head-mounted display further comprises an eye tracker configured to determine said gaze data related to an eye movement and send said gaze data to the scene renderer.

In a further example, the head-mounted display is adapted for virtual reality, augmented reality, mixed reality or other extended reality experiences.

Further, there is provided a computer program for generating motion blur for a sequence of image frames, comprising instructions which, when executed by a processor of a scene renderer, cause said scene renderer to perform the steps of: obtaining gaze data related to an eye movement between a first image and a consecutive image; determining a relative movement of at least one object in relation to said gaze data during a sequence of image frames, comprising at least two images, by calculating the difference in position of said at least one object and said gaze data between said first image frame and said consecutive image frame; forming a motion blur vector based on the relative movement of said at least one object in relation to said gaze data; and applying a motion blur on a second image frame based on said motion blur vector.

There is also provided a computer-readable medium comprising instructions which, when executed by a scene renderer, cause said scene renderer to perform the steps of: obtaining gaze data related to an eye movement between a first image and a consecutive image; determining a relative movement of at least one object in relation to said gaze data during a sequence of image frames, comprising at least two images, by calculating the difference in position of said at least one object and said gaze data between said first image frame and said consecutive image frame; forming a motion blur vector based on the relative movement of said at least one object in relation to said gaze data; and applying a motion blur on a second image frame based on said motion blur vector.

The advantage of the present disclosure is to immerse the user in a more realistic and natural virtual world to be displayed on a display. The precision in the eye measurements of the eye tracker contributes to the technical effect of this method that together with the rest of the method steps creates an enhanced virtual world.

DETAILED DESCRIPTION

With reference generally to FIGS. 2-6, the method and system according to the invention will now be described.

Figure 1:
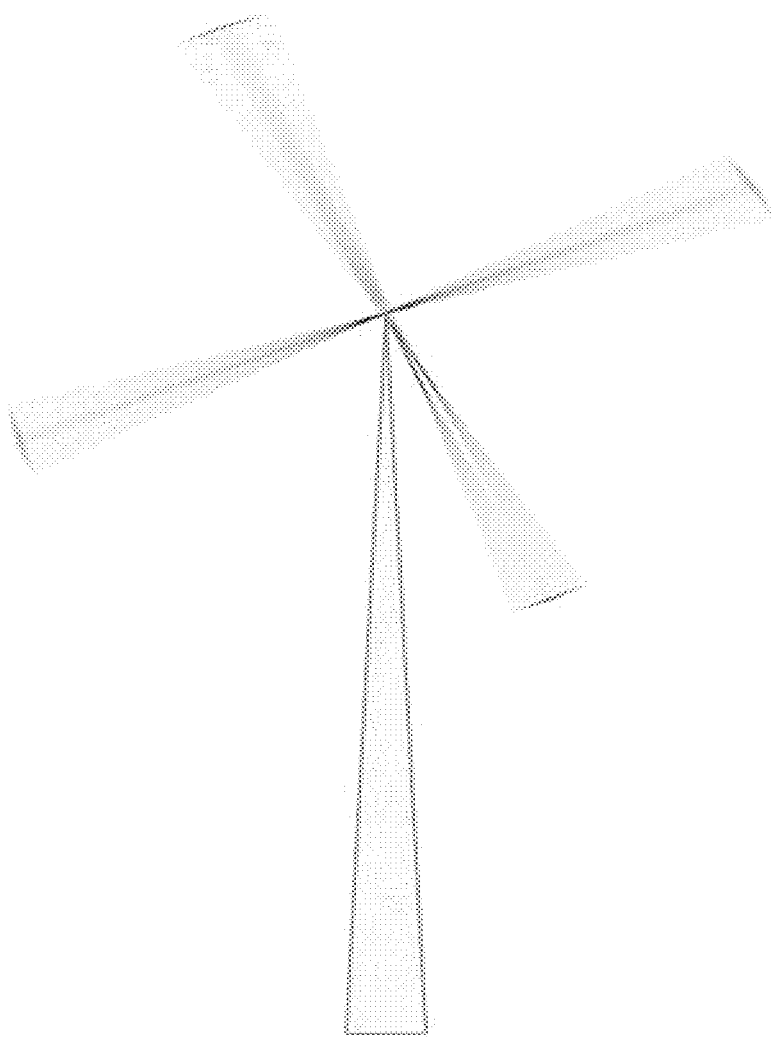
FIG. 1 depicts an object on a display with motion blur applied according to prior art.
Figure 2:
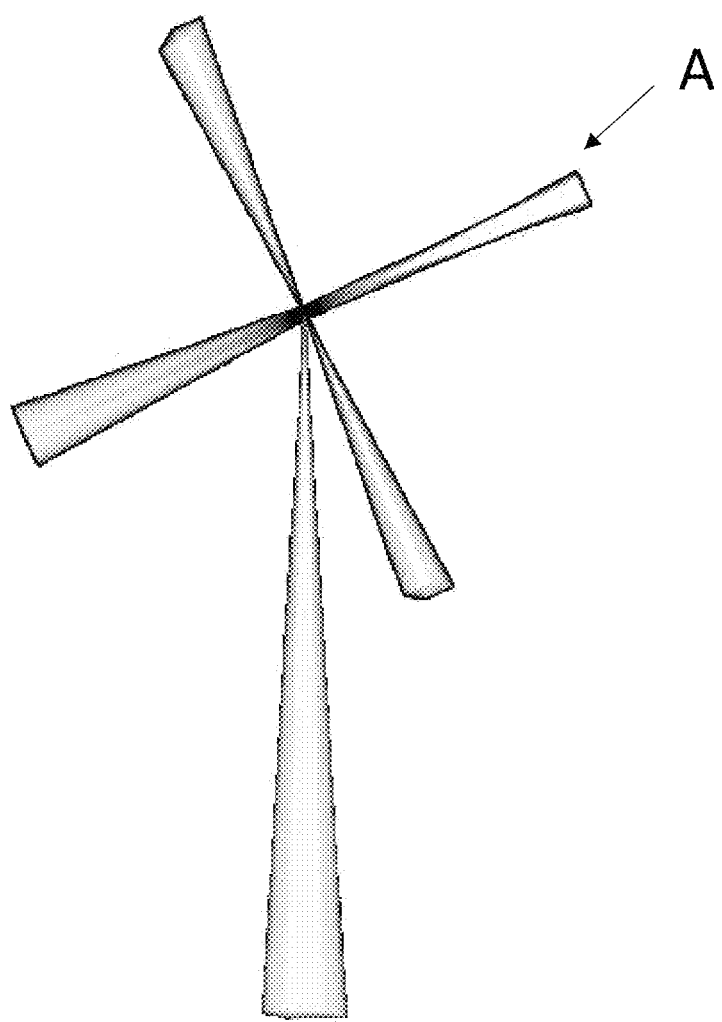
FIG. 2 depicts an object on a display with motion blur applied according to the present disclosure.

FIG. 2 depicts a windmill comprising four blades rendered on a display. As seen, the blade A is not blurry as the rest of the blades. The motion blur applied here differs from the prior art in that the motion blur is not uniformly applied. In fact, the motion blur takes into consideration the area that the user is looking at. In this case, the user is gazing at the blade A, so the motion blur is not applied in this focal area. In fact, this is how the human eyes perceive an object visually when the object is in movement. Accordingly, the method according to the present disclosure is imitating the user's natural way of looking at things. The picture/scene becomes more realistic and immersive for the user.

Figure 3:
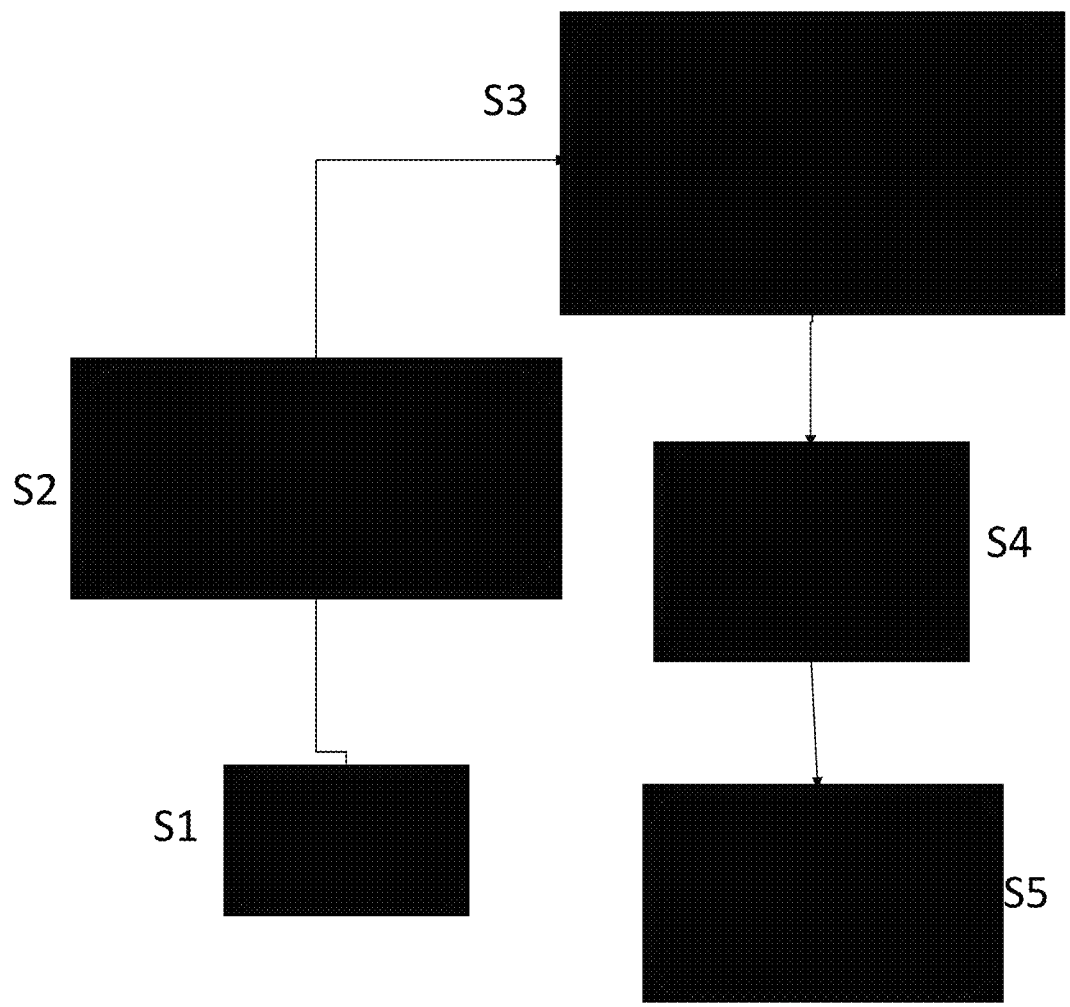
FIG. 3 shows a flowchart of an example of a method according to the present disclosure.

FIG. 3 shows a flowchart of an example of the method for generating motion blur of the present disclosure. The figure will be explained in detail in order to have a better understanding of how the motion blur is generated.

In order to obtain a method for generating motion blur, which enhances the immersion of the user into a virtual world, an eye tracker may be used.

The eye tracker is generally connected to a machine, e.g. a computer, and may be used for controlling that machine, through user interaction with a graphical user interface presented on a display, which is connected or coupled to that machine. The eye tracker is also capable of determining parameters of the gaze of the eyes when these are focusing on an object. These parameters are related to the movement, the orientation or the eye position of the user's eyes when looking at a moving object shown in the machine/display.

In step S1, the eye tracker provides the gaze data to at least one processor in the scene renderer. In this example, the gaze data is the information/parameters determined by the eye tracker between two consecutive images.

In step S2, a movement vector of said gaze data and a movement vector of said at least one object, are calculated by the processor. The movement vector of the gaze data represents the differences in position of the gaze of a user between two consecutive image frames. The movement vector of the at least one object represents the differences in position of the at least one object when moving between two consecutive image frames.

In step S3, a resultant vector is then determined by the processor between the movement vector of the gaze data and the movement vector of the at least one object. In other words, the resultant vector is the relative movement of the at least one object in relation to said gaze data during a sequence of image frames.

In the next figure, the calculation of the movement of a moving object are shown and will be explained in detail below.

Figure 4:
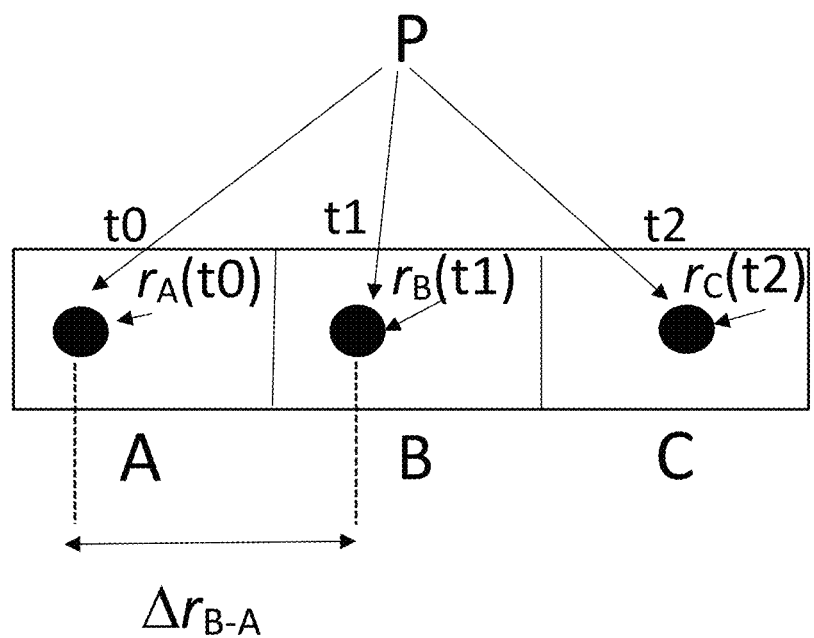
FIG. 4 shows a sequence of image frames according to an example of the method.

As shown in FIG. 4, a sequence of image frames A, B, C are depicted. This sequence of image frames, i.e. frames per second, may be captured by a scene camera or, when no scene camera is used. Each image frame is processed at a discrete time point t0, t1, t2 in a graphic processing unit GPU in a scene renderer. The frame images may be then rendered in a display either connected to a computer or as a part of a head-mounted display.

The display is generally comprising an array of optical micro-elements. The optical micro-elements may be active or passive. The array of optical micro-elements may be selected from arrays of micro-lenses; arrays of micro-holes; arras of liquid crystals, such as LCD or LCoS; arrays of gratings and arrays of phase masks. The digital display element may be selected from digital display screens such as LED, OLED, LCoS, LCD and SLM display screens. The display is full of pixels that are lit depending on the image data sent and controlled by the GPU.

The image data to be motion blurred is processed for each frame A, B, C by first determining the velocity of movement of at least one object that moves in the scene shown in the viewport of the display. The image data comprises information related to the image which is about to be rendered such as colours, perspective, shadows, moving objects, etc. In order to determine the velocity of movement of the at least one object, the image data is checked for each frame to see whether any image information has changed in a predetermined amount of time. Any change of the image data between consecutive frames, for instance between t1 and t0, may indicate that there are moving objects in the scene. The changes of the image data are generally pixel variations or differences stored in a direction vector, and represents the changes in movement e.g. horizontal movement of the moving objects in the scene. However, other movements are possible, such as rotation movements or other directions. These pixel values are then stored in a storage device as a part of a motion blur direction vector.

As previously explained, when an object appears on an image frame, it is represented by pixels that are illuminated on that frame according to the colours of the object. If the object is moving from one frame to another, other pixels may be then illuminated whilst previous ones may be switched off.

Let's assume that the first image frame A is processed at the start time t0, which indicates the start of the method steps. The consequent image frame B is processed at time t1 and the next one C is processed at time t2. During this time, i.e. t0-t2, a pixel P of the moving object may have probably moved from one position $r_A(t0)$ at frame A to another pixel position $r_B(t1)$ at frame B and later to $r_C(t2)$ at frame C. This can be seen in FIG. 4.

In order to determine the movement of the moving object over time, the difference in position of the pixel P between two consecutive image frames is calculated. In this case, the difference in position of pixel P in frames A and B whereby a part of the object is represented is:

$$\Delta r_{B-A} = r_B - r_A,$$

wherein $r=(X,Y,Z)$ is the direction vector of the pixel P and X, Y, Z are the space-time coordinates.

Not only the movement vector of the moving object over time is calculated but also the movement vector of the gaze data is calculated between two consecutive frames. If we assume that, the time difference between these frames is the same for both parameters, each movement vector is consequently the same as a velocity vector.

The resultant velocity vector is the distance between the movement vector of the gaze data and the movement vector of at least one object between two consecutive frames.

This distance is in fact the velocity of a user's gaze in relation to at least one moving object on a display. This fact allows the scene renderer to determine where the motion blur should not be applied. For instance, if a user is gazing at an object and the object is moving at the same speed as the user's gaze, this will mean that the user is focusing on this object. The method will then calculate a zero-velocity distance so the motion blur will not be applied to this object.

If returning to the method steps in FIG. 3, the next step is step S4. At this stage, the motion blur vector is formed based on the relative movement/velocity of each of the moving objects in relation to the gaze data. The motion blur vector is generated by taking into account the differences between the direction vectors, i.e. $\Delta r_{B-A}$, which will indicate where the user is gazing at and where the object is moving to and the vector is then stored in a storage device. The storage device could be any type of memory device, such as disk drives, optical storage devices, solid-state devices such as random access memory ("RAM") and/or a read-only memory ("ROM"), which can be programmable, flash-updatable and/or the like.

The motion blur vector may also be formed by determining a movement resultant vector between the relative movement of the at least one object and a movement vector of the gaze data.

In the case, a motion scene camera is used, for instance when using a desktop computer, the motion blur vector may also be based on a motion scene camera movement provided by the motion scene camera. Generally, at least one processor determines the capture rate of the scene camera that captured the sequence of image frames, i.e. frames per second. This motion scene camera movement is the movement of the image frames per second or frame rate of the display.

The next step S5 is then to apply the motion blur on the second frame, i.e. frame C. The second frame may not always be the consecutive frame due to a time delay in processing the data in the scene renderer.

The motion blur is then distributed in all parts of the image frame that are not gazed by the user, rendering a most clear, realistic and focused image for the user.

As indicated above, the logic required to enable the scene renderer to perform the above-described method may be implemented by means of software. To this end, the scene renderer may comprise at least one processor for executing the above-mentioned computer program. The computer program may be stored in or loaded into a computer-readable storage medium of the scene renderer, e.g. in the form of a non-volatile memory.

Installation of such a computer program in scene renderer may allow these to carry out the above-described method without or with a minimum of hardware modification.

Figure 5:
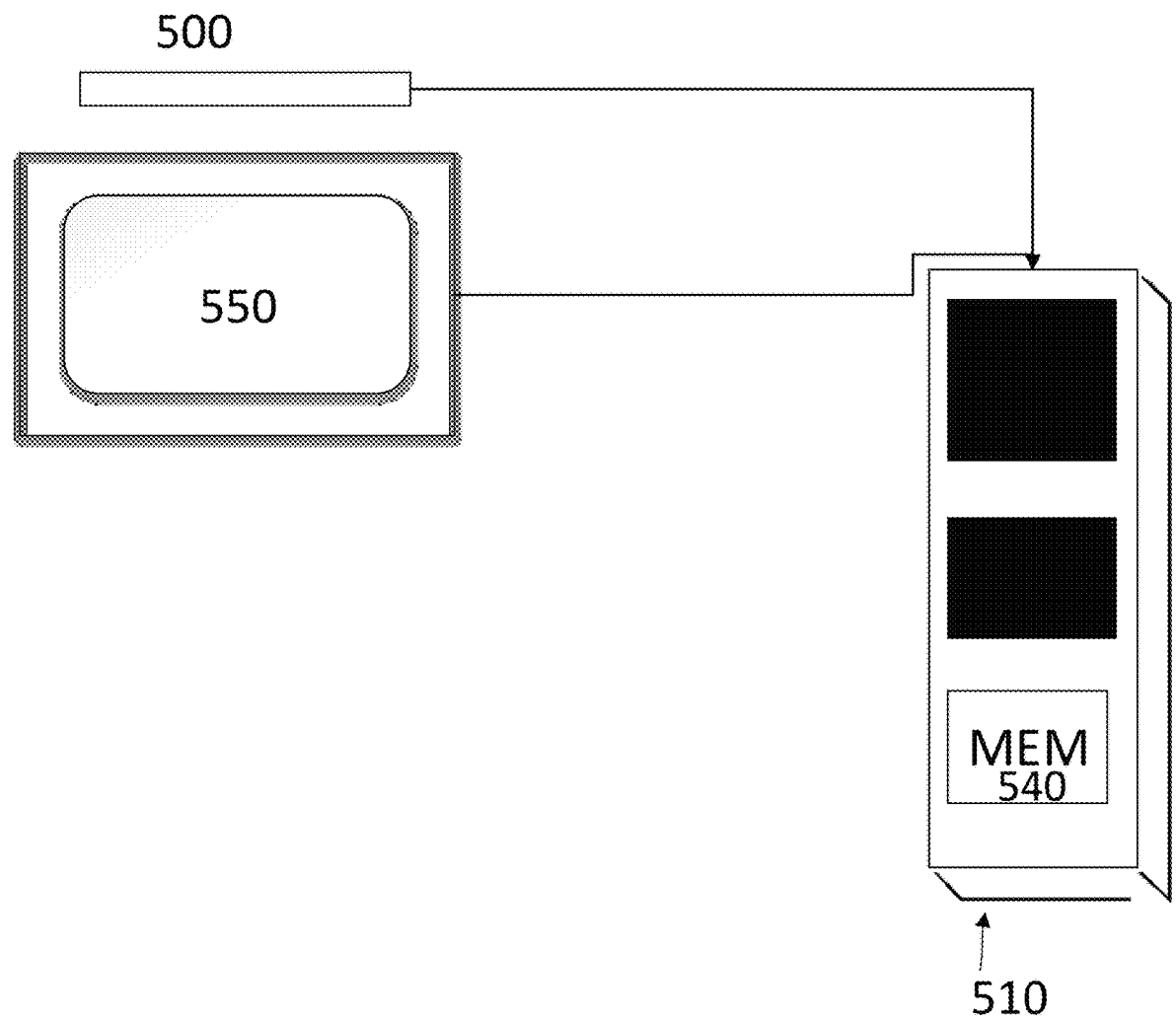
FIG. 5 shows an exemplary system of the present disclosure.

In FIG. 5, an example of a system according to the present disclosure is shown.

The system shows a desktop computer 510 connected to an eye tracker 500 and to a display 550. The desktop computer may be a scene renderer and comprises a central processing unit CPU 520, a graphic processing unit GPU 530 and at least one storage device or memory MEM 540.

The eye tracker 500, is configured to determine gaze data related to an eye movement for each image frame. The gaze data between a first image and a consecutive image is sent to the scene renderer 510 to be processed. However, in an alternative embodiment the system does not comprise an eye tracker 500. Instead the gaze data related to an eye movement for each image frame may be sent to the scene renderer 510 from any other source via any communication means and/or protocol.

As earlier explained, the scene renderer 510 is configured to obtain the gaze data to determine a relative movement of at least one object in relation to that gaze data during a sequence of image frames with at least two images. In order to determine a movement vector of the object and of the gaze data, a difference in position of said at least one object and said gaze data between the first image frame and the consecutive image frame, is calculated by at least one processor 520, 530 in the scene renderer 510.

The motion blur vector is then formed/created by using the calculated difference in position of at least one object in relation to the gaze of the user. The information from this movement resultant vector allows the scene renderer 510 to apply motion blur in predefined areas outside the actual gaze point.

Figure 6:
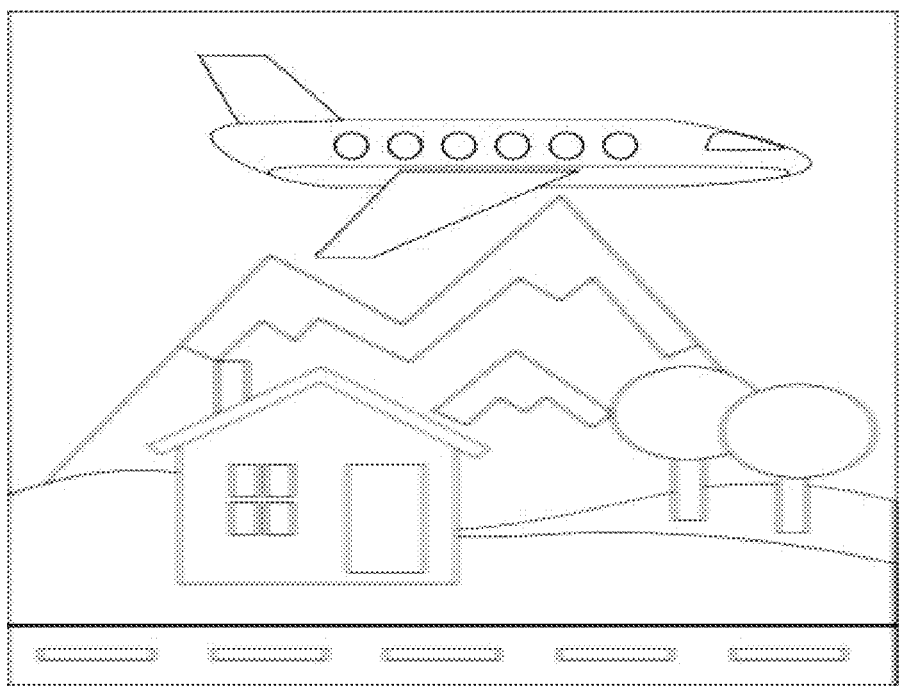
FIG. 6 shows scene rendered images on a display according to the present disclosure.
Figure 6:
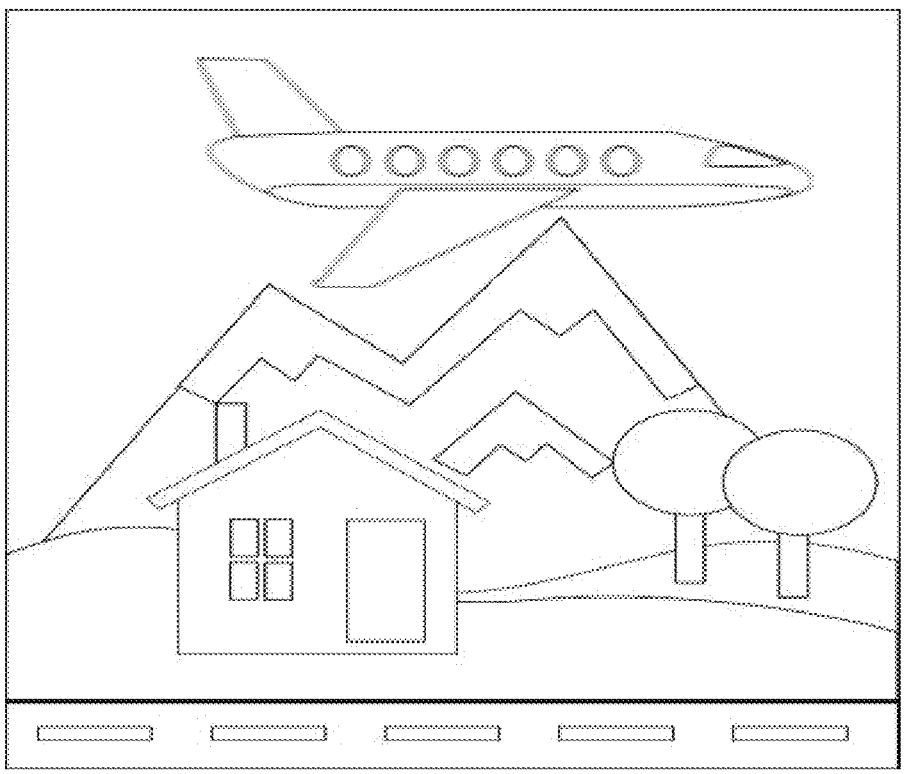

FIG. 6 shows two examples of scene rendered images where motion blur has been applied in relation to the user's gaze. As seen on the top side of the picture, the user is focusing on the airplane, which image is clear and focused in comparison to the landscape around him. In this case, the motion blur has only been applied to the landscape using the method according to the present disclosure.

The next example shows a user gazing at the landscape. As seen in the picture, the airplane is motion blurred whilst the landscape is sharp.

Whilst the invention has been described with respect to illustrative embodiments thereof, it will be understood that various changes may be made in the apparatus and means herein described without departing from the scope and the teaching of the invention. Accordingly, the described embodiments are to be considered merely exemplary and the invention or disclosure is not to be limited except as specified in the attached claims.

The invention claimed is:

1. A method for generating motion blur, said method comprising steps of:
   obtaining gaze data related to an eye movement between a first image and a consecutive image,
   determining a movement vector of said gaze data,
   determining a relative movement of at least one object resulting from said gaze data during a sequence of image frames, comprising at least two images, by calculating a difference in position of said at least one object and said gaze data between said first image frame and said consecutive image frame,
   forming a motion blur vector based on the relative movement of said at least one object in relation to said gaze data by determining a movement resultant vector between said relative movement of said at least one object and the movement vector of said gaze data, and
   applying a motion blur on a second image frame non-uniformly based on said motion blur vector.

2. The method according to claim 1, wherein the step of forming a motion blur vector is further based on a motion scene camera movement provided by a motion scene camera used for capture said sequence of image frames.

3. The method according to claim 1 wherein there is a time delay between said consecutive image frame and said second image frame.

4. The method according to claim 1, wherein said second image frame and said consecutive image frame are the same frame.

5. The method according to claim 1, wherein said gaze data comprises measurements of an eye orientation.

6. A system for generating motion blur for a sequence of image frames comprising:
   a scene renderer comprising at least one processor configured to:
      obtain gaze data related to an eye movement between a first image and a consecutive image;
      determine a movement vector of said gaze data,
      determine a relative movement of at least one object resulting from said gaze data during a sequence of image frames, comprising at least two images by calculating a difference in position of said at least one object and said gaze data between said first image frame and said consecutive image frame;
      form a motion blur vector based on the relative movement of said at least one object in relation to said gaze data by determining a movement resultant vector between said relative movement of said at least one object and the movement vector of said gaze data; and
      apply a motion blur on a second image frame non-uniformly based on said motion blur vector.

7. The system according to claim 6, wherein the system further comprises a scene camera configured to capture a sequence of image frames, each having at least one object.

8. The system according to claim 6, wherein the system further comprises an eye tracker configured to determine said gaze data related to an eye movement and send said gaze data to the scene renderer.

9. A head-mounted display, said head-mounted display comprising:
   a frame adapted to be worn by a user;
   a display; and
   a scene renderer comprising at least one processor configured to:
      obtain gaze data related to an eye movement between a first image and a consecutive image;
      determine a movement vector of said gaze data; determine a relative movement of at least one object resulting from said gaze data during a sequence of image frames, comprising at least two images by calculating a difference in position of said at least one object and said gaze data between said first image frame and said consecutive image frame;
      form a motion blur vector based on the relative movement of said at least one object in relation to said gaze data by determining a movement resultant vector between said relative movement of said at least one object and the movement vector of said gaze data; and
      apply a motion blur on a second image frame non-uniformly based on said motion blur vector;
   wherein the display is configured to render said applied motion blur on the second image frame.

10. The head-mounted display according to claim 9, wherein the head-mounted display further comprises an eye tracker configured to determine said gaze data related to an eye movement and send said gaze data to the scene renderer.

11. The head-mounted display according to claim 9, wherein the head-mounted display is adapted for virtual reality, augmented reality, mixed reality or other extended reality experiences.

* * * * *